(No Model.)
A. CHAMBERS.
REAPER OR MOWER.
No. 507,884. Patented Oct. 31, 1893.
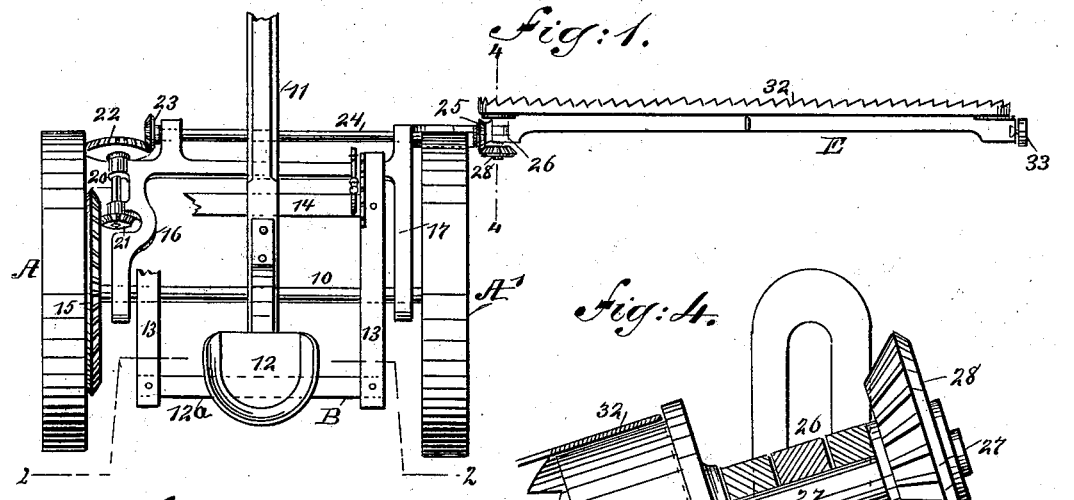
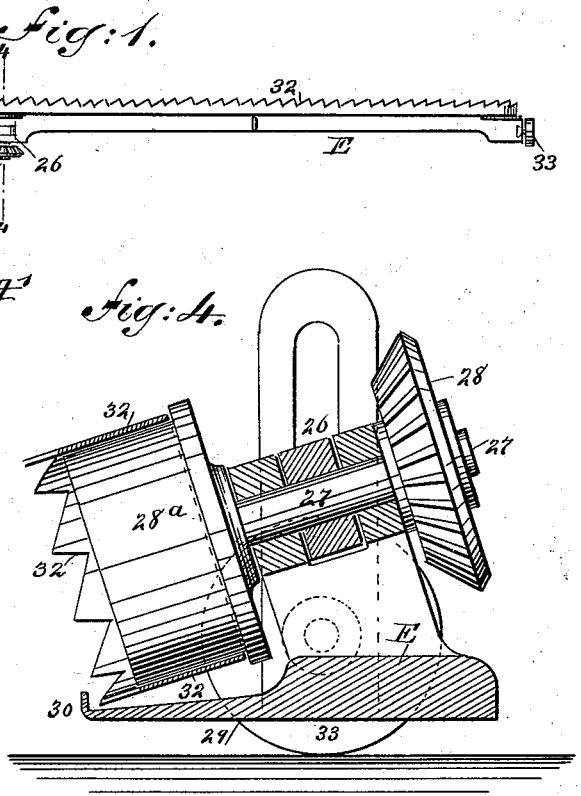
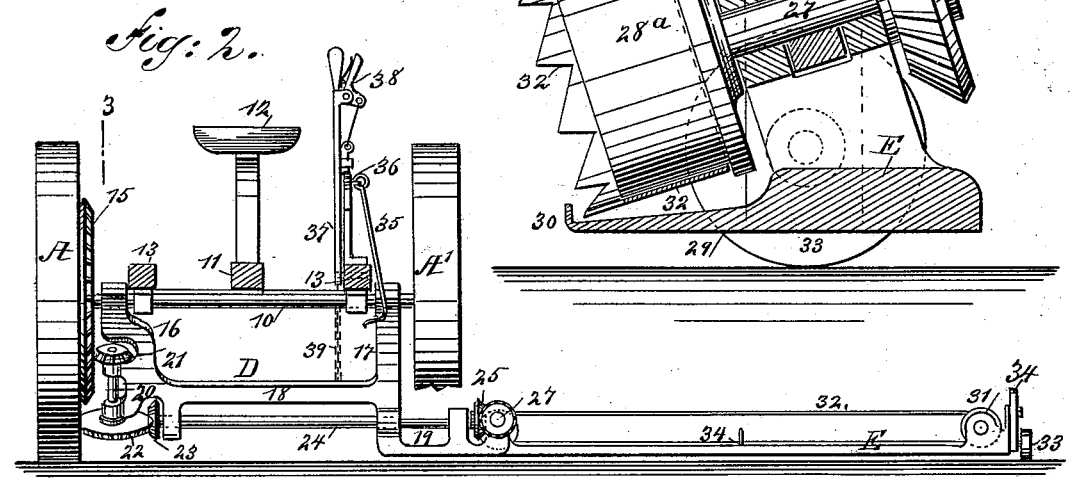
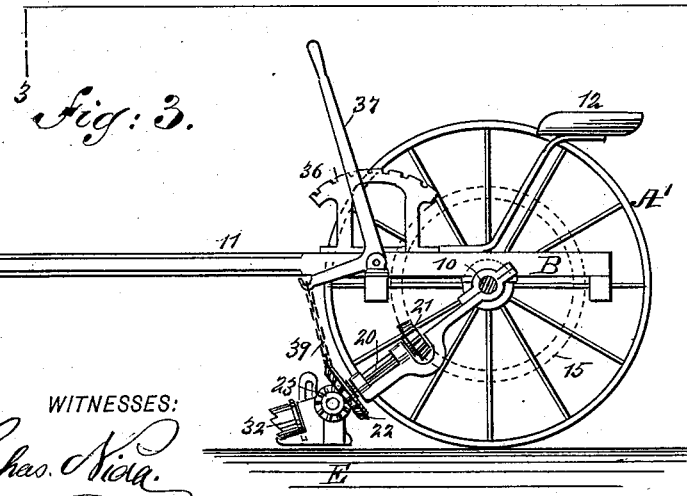
WITNESSES:
Chas. Nida.
C. Sedgwick.
INVENTOR
A. Chambers
BY Munn & Co.
ATTORNEYS.

UNITED STATES PATENT OFFICE.

ALEXANDER CHAMBERS, OF TARRYTOWN, NEW YORK.

REAPER OR MOWER.

SPECIFICATION forming part of Letters Patent No. 507,884, dated October 31, 1893.

Application filed November 25, 1892. Serial No. 453,074. (No model.)

*To all whom it may concern:*

Be it known that I, ALEXANDER CHAMBERS, of Tarrytown, in the county of Westchester and State of New York, have invented a new and useful Improvement in Reapers and Mowers, of which the following is a full, clear, and exact description.

My invention relates to an improvement in reapers and mowers, and has for its object to provide an improvement in the knives of such machines; and a further object of the invention is to provide a knife which will be continuous or endless, and to provide a means whereby the upper stretch of the knife will be the cutting surface, while the lower stretch will be prevented from having a cutting action.

The invention consists in the novel construction and combination of the several parts, as will be hereinafter fully set forth and pointed out in the claims.

Reference is to be had to the accompanying drawings forming a part of this specification in which similar figures and letters of reference indicate corresponding parts in all the views.

Figure 1 is a plan view of the cutter bar of a reaper or mower having the improvement applied thereto, and also of one form of driving mechanism applied to the knives. Fig. 2 is a partial rear elevation and section, the section being taken practically on the line 2—2 of Fig. 1. Fig. 3 is a vertical section taken practically on the line 3—3 of Fig. 2; and Fig. 4 is a section taken practically on the line 4—4 of Fig. 1.

In carrying out the invention the supporting wheels A and A', are mounted upon an axle 10, which axle also supports the pole 11, and the pole supports the driver's seat 12. A frame B, is also carried by the axle, constituting a rear bar 12ᵃ and side bars 13, which side bars are preferably connected by a front bar 14. One of the driving wheels A, for example, has secured to its inner side a beveled wheel 15; and upon the axle a swinging frame D, is supported, which frame may be said to consist of two downwardly extending side members 16 and 17, connected by a cross bar 18, the side member 17, being provided with an attached shoe 19. The member 16 of the swinging frame is adjacent to the driving wheel A, and in that member of the frame a shaft 20, is journaled, and this shaft carries a beveled pinion 21, which meshes with the beveled gear 15, and the shaft also carries a beveled gear 22, which meshes with a beveled pinion 23, fast upon a drive shaft 24, said shaft being journaled in both members 16 and 17 of the swinging frame, and likewise in the shoe. The outer end of the shaft 24, is also provided with a beveled pinion 25, securely fastened to it, and the finger bar E, has a hinged connection with the shoe 19 of the swinging frame, as is shown at 26 in Fig. 1. Where the finger bar hinges with the shoe a shaft 27 is located, upon which the finger bar turns and this shaft carries at one end a pinion 28, which meshes with the pinion 25 upon the driving shaft 24; and at its opposite or outer end the shaft 27, carries a wheel 28ᵃ, but the shaft 27 and the pulley 28ᵃ are diagonally located, that is to say, the shaft and pulley have an inclination from the rear side of the cutter bar downward in direction of the ground, whereby the upper face of the pulley extends some distance outward beyond its under face, or whereby when a line is drawn perpendicularly from the upper face of the pulley, the lower face of the pulley will be some distance rearward of that line, as shown in Fig. 4. The cutter bar is also provided at its under side with a guard 29, which extends from end to end of the cutter bar; and the forward edge of the guard 29, is upturned, as shown at 30 in Fig. 4. The pulley 28ᵃ, is located as has heretofore been stated at the inner end of the cutter bar, and a similar pulley 31, is located near the outer end of the bar, and at this point in the construction of the machine the important feature of the invention exists, namely, the introduction of the endless cutter 32, which endless cutter passes over the inner pulley 28ᵃ and the outer pulley 31, and by reason of the inclination of the pulleys 28ᵃ and 31, their inclination being the same, the upper strand or stretch of the endless knife is brought into position to cut the grain, while the lower stretch is carried somewhat rearward and back of the upturned member 30 of the guard 29, thus rendering the lower stretch of the knife incapable of cutting anything that is presented to it.

The finger bar may be and preferably is provided with a supporting wheel 33 at its outer end, and a loop 34, is likewise placed upon the bar, which is adapted to be engaged by a hook 35, when the bar is elevated, to hold the bar in such position, the hook being fast to a rack 36, secured upon the frame B of the machine. This frame has likewise fulcrumed upon it a lever 37, provided with a hand latch 38, or its equivalent, to engage with the rack 36; and this lever 37, is connected by a chain 39, or its equivalent, with the swinging frame D, whereby the frame D may be elevated so as to carry the finger bar from the ground; as heretofore stated, the finger bar may be elevated to a vertical position when the machine is to be taken to or from a field and held in that position by the hook 35.

The main feature of this invention consists in the application to a reaper, mower or like machine, of an endless knife and a mechanism for driving the same, and the knife may be provided with any approved form of guard.

Having thus described my invention, I claim as new and desire to secure by Letters Patent—

1. In a reaper or mower or like machine, the combination, with the finger bar and pulleys arranged thereon having an inclined or diagonal position, of an endless band or knife carried by the said pulleys, the endless band or knife being set at an angle thereof horizontally and returning under or below its positive cutting edge and at a distance in the rear of the same, substantially as set forth.

2. In a reaper, mower or like machine, the combination, with the cutter supporting bar provided with a lower guard and pulleys arranged above the guard, sustaining a diagonal relation thereto, of an endless or band knife passed over the pulleys, the lower stretch of knife being protected by the guard, as and for the purpose set forth.

ALEXANDER CHAMBERS.

Witnesses:
FANNY W. HOPKINS,
THOS. P. CHAMBERS.